March 3, 1942.	R. R. MACHLETT	2,274,865
X-RAY TUBE
Filed Feb. 3, 1940
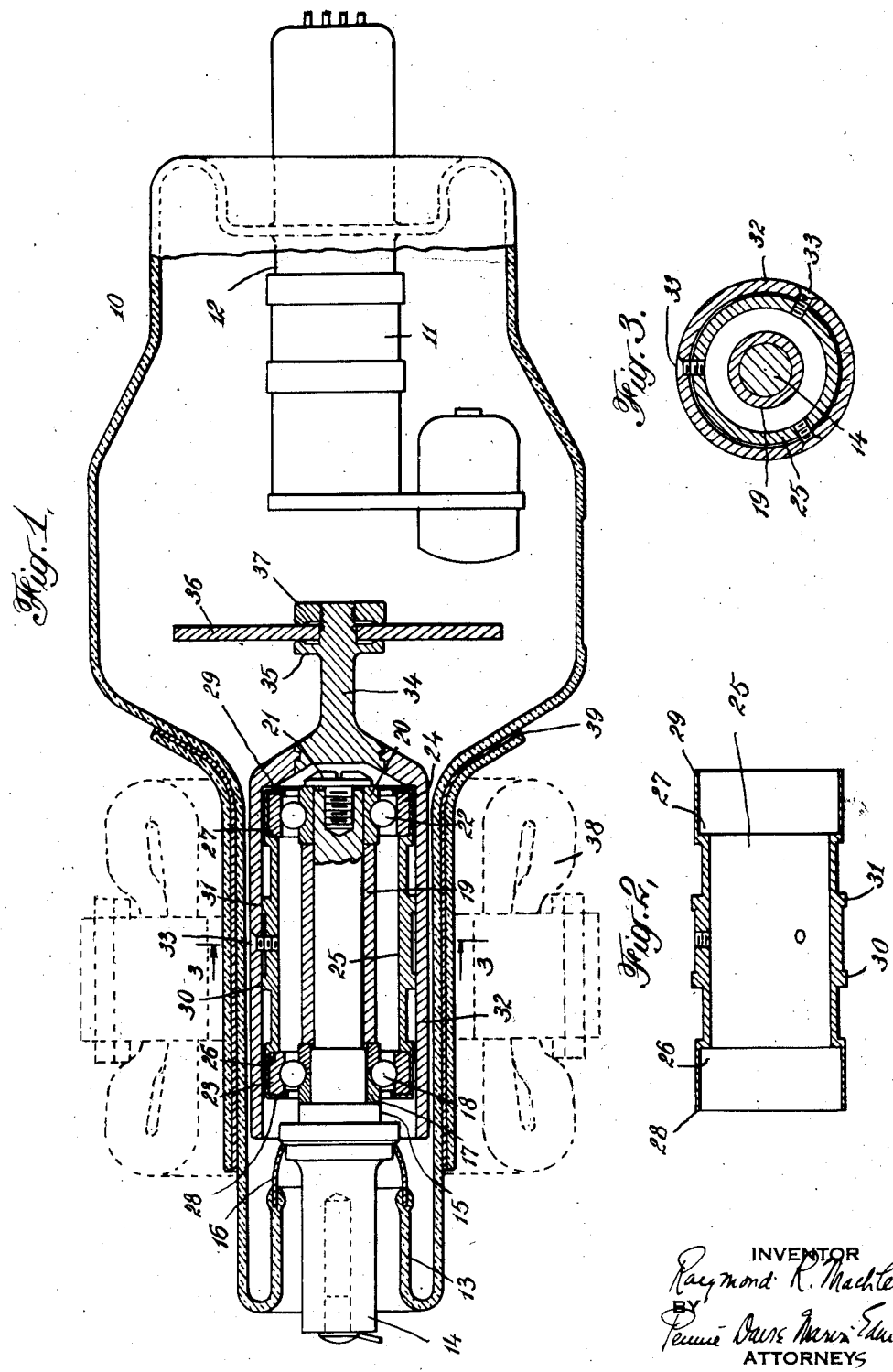
INVENTOR
Raymond R. Machlett
BY
Pennie Davis Marvin Edmonds
ATTORNEYS Patented Mar. 3, 1942

2,274,865

UNITED STATES PATENT OFFICE 2,274,865

X-RAY TUBE

Raymond R. Machlett, Riverside, Conn., assignor to Machlett Laboratories Incorporated, Springdale, Conn., a corporation of Connecticut Application February 3, 1940, Serial No. 317,097

7 Claims. (Cl. 250—148)

This invention relates to X-ray tubes having a rotary anode and is concerned more particularly with a novel rotary anode assembly for use in such tubes, which is superior to those heretofore used in that it has a longer life and operates with less friction and noise.

Rotary anodes for use in X-ray tubes now ordinarily include a metal cylinder mounted for rotation on a metal shank sealed through the wall of the evacuated envelope, the cylinder carrying a target which may take the form of a body of tungsten embedded in the end of the cylinder or may be a tungsten disc carried on a stem connected to the cylinder. The cylinder acts as the rotor of an induction motor, the stator coils of which lie outside the envelope, and the cylinder consists of copper and ferromagnetic material in various arrangements, such material being employed to provide a path of low reluctance for the magnetic flux. The rotor is mounted on one or more bearings and the best arrangement involves the use of a pair of ball bearings near opposite ends of the rotor.

A rotary X-ray tube anode must fulfill a number of requirements if it is to give satisfactory service and those requirements arise from the severe conditions under which it is to operate. Thus, the rotor and target are subjected to high temperatures during the usual degasifying operation in the manufacture of the tube and are also highly heated during operation at heavy load. The anode assembly should, therefore, be so constructed that the high temperature of the rotor is not readily transmitted to the bearings and at the same time the parts should permit outgassing without difficulty and with a minimum of processing in their final assembled condition.

The rotor should operate with low energy loss to avoid unnecessary heating and with sufficient torque to overcome the friction of the bearings and rotate the target at the desired rate. The bearings must be capable of operation with low friction and without the use of ordinary lubricants, since their vapor would interfere with the functioning of the tube. In addition, the entire assembly should retain its shape in spite of numerous heating and cooling cycles. If expansion of the rotor causes misalignment of the bearings or loosening of the parts with resultant unbalanced operation, the bearings will wear rapidly, particularly at high speed, and also operation of the tube will be objectionably noisy.

The rotary anode of the present invention fulfills the above requirements and consequently gives excellent performance and has a long working life. In its preferred form, it includes a cylinder made wholly of copper and carrying a target. The cylinder is mounted for rotation on a shank sealed through the wall of the envelope and two ball bearings are interposed between the cylinder and shank. The inner races are secured on the shank in proper spaced relation and the outer races are secured to the copper cylinder and held with their axes aligned by suitable means. For this latter purpose, various expedients may be used, as, for example, the outer races may be secured within a tubular member, preferably of copper, which lies telescoped within the cylinder and makes contact therewith only over a narrow circumferential area lying between the ends of the cylinder. The remainder of the opposed surfaces of the member and cylinder are spaced apart and are highly polished, so that heat passes from the target and cylinder to the member and bearings mainly through the small area of contact between the cylinder and member and this provides a heat transmitting path of low conductivity.

For a better understanding of the invention, reference may be made to the accompanying drawing in which:

Fig. 1 is a view in longitudinal section, with parts shown in elevation, through an X-ray tube in which the new rotor assembly is employed;

Fig. 2 is a longitudinal sectional view through a part of the rotor assembly; and Fig. 3 is a sectional view on the line 3—3 of Fig. 1.

The X-ray tube illustrated in Fig. 1 includes the usual evacuated envelope 10 within which is a cathode structure 11 mounted on an inward extension 12 of the envelope wall at one end of the envelope and including an incandescible cathode. At its other end, the envelope has a reentrant portion 13 through which is sealed a shank 14 which is of substantial cross-section and preferably made of copper. That part of the shank lying within the envelope is formed with a portion 15 of enlarged diameter lying near the sealing sleeve 16, and mounted on the shank in contact with the shoulder forming the inner face of the portion 15 is the split inner race 17 of a ball bearing. The two parts of the race have working faces formed with a channel in which runs a row of balls 18, and the parts of the race are held together and against the shoulder by a spacing sleeve 19 which is preferably of copper. At the end of the spacing sleeve, the inner race 20 of a ball bearing is mounted on the shank and a screw 21 is threaded into the shank so that its head bears against the end of the race 20 and holds the race in contact with the end of the spacing sleeve 19. The race 20 has a working face with a circumferential channel within which runs a row of balls 22. The bearing near the seal is completed by an outer race 23 having a channeled working face, while the other bearing is provided with an outer race 24, the working face of which is flat.

The bearing system described is that disclosed in my co-pending application Serial No. 266,448, filed April 7, 1939, and the use of the outer race 24 having a flat working face in association with a channeled inner race permits the races to move relatively to one another in a direction lengthwise of the shank without their having any binding effect upon the balls between them. The bearings are also constructed in accordance with the principles of the invention disclosed and claimed in a co-pending application of Skehan and Agule, Serial No. 260,884, filed March 10, 1939. According to the Skehan and Agule invention, the bearing members are made of a hard metal, such as an alloy steel, and the working faces of the members which roll one upon the other are provided with a thin filament of a metal, such as silver, which has a low vapor pressure and a low affinity for the hard metal and appears to function as a lubricant under the usual conditions of service.

The outer races 23 and 24 of the ball bearings are secured together against relative displacement lengthwise of the shank and in the construction shown, the means employed for the purpose is a tubular member 25 which is made of copper and is formed with internal circumferential recesses 26, 27 at its ends. In assembling the member and races, the races 23, 24 are placed within the recesses in contact with the shoulders at the inner ends thereof, and the ends 28, 29 of the tubular member are then spun down over the outer ends of the races and against the inner surfaces, so that the races are held securely in position. The tubular member is formed with a pair of narrow circumferential bands 30, 31 spaced a short distance apart and lying on either side of its median plane, and the outer surface of the member is polished so that it has good heat reflecting properties.

Telescoped over the tubular member 25 is a copper cylinder 32 which has an inner surface formed to minimize radiation therefrom, as by polishing, and this surface lies in contact with the outer faces of the bands 30, 31, the opposed faces of the cylinder and tubular members being spaced apart elsewhere. The cylinder and tubular member are secured together by a number of screws 33 threaded through the cylinder and into the tubular member between the bands 30, 31 and with the construction described, there is poor heat transmission between the cylinder and tubular member because of the limited areas of the parts which are in direct contact and because of the polish given to the opposed surfaces.

At its inner end, the cylinder is provided with a target which may be a body of tungsten embedded therein in accordance with the usual practise or may be mounted on a stem secured to the cylinder. In the construction illustrated, the cylinder has a stem 34, preferably made of a metal such as molybdenum, which is a poor conductor of heat, and the stem is formed as an integral part of the cylinder during the formation of the latter by vacuum casting. The stem is provided with a disc 35 having a flange on one face which is cut away to provide spaced lugs, and mounted on the stem beyond the disc and with one face in contact with the ends of the lugs is a target disc 36 of tungsten. The target disc is held in place by a nut 37 threaded on the end of the stem, the nut being formed with spaced lugs projecting from the face opposed to the disc and having ends in contact therewith.

Mounted to encircle the elongated neck of the envelope in which the rotor lies are stator coils 38 of conventional construction, and a sleeve 39 of insulating material may be interposed between the coils and the envelope wall. The rotor lies within the field produced by the coils and the combination of stator and rotor act in the usual way as an induction motor to produce rotation of the target disc 36.

It will be observed that the parts of the new rotary anode lying within the field produced by the stator are made wholly of copper and contain no ferromagnetic material. Also, the path of the magnetic flux developed by the stator is entirely free of ferromagnetic material, since there is no such material in that path, either in the rotor or in any other part of the device. The prior devices were evidently constructed in accordance with principles of induction motor design and without regard to the special conditions prevailing in vacuum tubes. Thus, commercial induction motors are made with an extremely small gap between rotor and stator, while in an X-ray tube, the gap must be large to guard against electrical puncture when high voltage is applied to the tube terminals. Because of this large gap, the use of ferromagnetic material in the rotor of a motor for driving an X-ray tube anode performs little useful effect in providing a low reluctance path for the magnetic flux and is accompanied by an increase in the ohmic resistance of the rotor because of the replacement of the highly conductive copper with an equivalent amount of less conductive ferromagnetic material. Also the presence of the iron results in the generation of heat because of the hysteresis effects. Since in small induction motors, such as those under discussion, the iron losses are always high, as, for example, of the order of 20%, the elimination of iron from the rotor of the present anode assembly substantially reduces the heating resulting from energy loss.

A further advantage of the rotor formed of a single metal is that it will retain its shape and balance during the heating and cooling cycles of operation, and this is not the case with the prior composite structures. Also, the all-copper rotor is much easier to degasify than a composite structure.

The use of the tubular member as a means for holding the outer races of the ball bearings against relative displacement lengthwise of the shank is particularly advantageous in association with a rotor cylinder carrying a target in the form of a body of tungsten embedded therein. With that construction, the heat developed in the target in operation is transmitted directly to the cylinder and by the use of the tubular member described, the transmission of the heat to the bearings is inhibited by reason of the path of poor conductivity between the cylinder and tubular member and the provision of opposing surfaces on the cylinder and member which, in one case, minimizes radiation and in the other, has good heat reflecting properties.

I claim:

1. An X-ray tube which comprises an evacuated envelope containing an incandescible cathode, a shank sealed through the wall of the envelope, a rotor into which the portion of the shank within the envelope extends, the rotor comprising inner and outer separate telescoped members of generally cylindrical form contacting only over a relatively narrow circumferential zone between their ends, the contacting areas on the faces of the members forming a heat transmitting path of low conductivity from one member to the other, bearing means between the inner member and the shank, and a target secured directly to the outer member only to rotate therewith.

2. An X-ray tube which comprises an evacuated envelope containing an incandescible filament, a shank sealed through the wall of the envelope, a rotor into which the portion of the shank within the envelope extends, the rotor comprising inner and outer separate telescoped members of generally cylindrical form contacting only over a relatively narrow circumferential zone between their ends, the spaced portions of the opposed faces of the members being polished and having high heat reflecting power and the contacting areas of the members forming a heat transmitting path of low conductivity between the members, bearing means between the inner member and the shank, and a target secured directly to the outer member only to rotate therewith.

3. An X-ray tube which comprises an evacuated envelope having a copper shank sealed through the wall thereof, a rotor into which the portion of the shank within the envelope extends, the rotor including a generally cylindrical copper member and a target secured thereto, bearings between the inside of the rotor and the outside of the shank each comprising inner and outer races and a row of balls between, means on the shank for holding the inner races against relative displacement lengthwise of the shank, said means including a copper sleeve on the shank between said inner races, and a copper element connecting the outer races and holding them against relative displacement lengthwise of the shank, the copper element being connected to the cylindrical member between the ends thereof and spaced therefrom elsewhere.

4. A rotor suitable for use within an evacuated envelope which comprises a metal cylinder, an element of generally tubular form within the cylinder and contacting therewith only along a circumferential zone lying between the ends of the cylinder, the element having spaced circumferential recesses in its inner surface at opposite sides of said zone, means adjacent said zone for connecting the cylinder and element together, and a target connected directly to the cylinder only and lying at one end thereof.

5. An X-ray tube which comprises an evacuated envelope containing an incandescible cathode, a rotor support including a shank sealed through the wall of the envelope, that portion of the support within the envelope being free of ferromagnetic material, a rotor into which the portion of the shank within the envelope extends, the rotor being a cylinder having a hollow unobstructed interior and made wholly of non-ferrous metal of high electrical conductivity, bearings having elements rolling one upon the other interposed in spaced relation between the cylinder and shank, a target secured to the rotor to rotate therewith, and a stator outside the envelope generating a magnet field cutting the cylinder, the path of the magnetic flux developed by the stator being free of ferromagnetic material and lying between and spaced from said bearings.

6. An X-ray tube which comprises an evacuated envelope containing an incandescible cathode, a rotor support including a shank sealed through the wall of the envelope, that portion of the support within the envelope being free of ferromagnetic material, a rotor into which the portion of the shank within the envelope extends, the rotor being made wholly of non-ferrous metal of high electrical conductivity, spaced bearing means on the portion of the shank within the envelope on which the rotor runs, a target secured concentrically to the rotor, and a stator lying outside the envelope generating a magnetic field in which the path of the flux cuts the rotor only and is free of ferromagnetic material, said path lying between and spaced from said bearing means.

7. An X-ray tube which comprises an evacuated envelope containing an incandescible cathode, a shank sealed through the wall of the envelope, a rotor into which the portion of the shank within the envelope extends, the rotor comprising separate inner and outer generally cylindrical telescoped members contacting over a minor portion of their opposed faces and said faces elsewhere being spaced apart and polished to have high heat reflecting power, bearing means between the inner member and the shank, and a target secured directly to the outer member only to rotate therewith.

RAYMOND R. MACHLETT.